United States Patent
Ericsson

(10) Patent No.: US 8,033,206 B2
(45) Date of Patent: Oct. 11, 2011

(54) PAIR OF SAW BLADES

(75) Inventor: Hans Ericsson, Färjestaden (SE)

(73) Assignee: Indocean Diamond Tools, BM-Hamilton HM EX (BM)

( * ) Notice: Subject to any disclaimer, the term of this patent is extended or adjusted under 35 U.S.C. 154(b) by 0 days.

(21) Appl. No.: 12/662,729

(22) Filed: Apr. 30, 2010

(65) Prior Publication Data

US 2010/0212472 A1 Aug. 26, 2010

Related U.S. Application Data

(62) Division of application No. 10/477,429, filed as application No. PCT/SE02/00930 on May 16, 2002.

(30) Foreign Application Priority Data

May 16, 2001 (SE) ........................................ 0101714

(51) Int. Cl.
*B27B 33/14* (2006.01)
(52) U.S. Cl. ................. 83/835; 83/666; 83/837; 83/838
(58) Field of Classification Search .................... 83/835, 83/664, 837, 846, 666, 836, 838; 144/218–241
See application file for complete search history.

(56) References Cited

U.S. PATENT DOCUMENTS

| | | | | |
|---|---|---|---|---|
| 588,082 A | | 8/1897 | Perkins | 144/222 |
| 2,592,382 A | | 4/1952 | Blais | 407/31 |
| 3,708,129 A | * | 1/1973 | Nowak | 241/189.1 |
| 3,927,447 A | * | 12/1975 | Willinger | 407/29.12 |
| 4,605,933 A | | 8/1986 | Butscher | 343/700 MS |
| 4,632,162 A | * | 12/1986 | Angeloni | 144/229 |
| 4,784,029 A | * | 11/1988 | Gebelius | 83/13 |
| 5,104,744 A | * | 4/1992 | Haas | 428/596 |
| 6,082,238 A | | 7/2000 | Zelt, III | 83/664 |
| 6,135,004 A | * | 10/2000 | Gebelius | 83/835 |
| 6,962,147 B2 | * | 11/2005 | Hamilton | 125/13.01 |
| 7,013,784 B2 | | 3/2006 | Lowder et al. | 83/848 |
| 2003/0000363 A1 | * | 1/2003 | Hofmann et al. | 83/837 |

FOREIGN PATENT DOCUMENTS

| | | |
|---|---|---|
| FR | 2192483 | 1/1974 |
| FR | 2192483 | 2/1974 |
| WO | WO 86/02590 | 5/1986 |
| WO | WO 8602590 A1 * | 5/1986 |

* cited by examiner

*Primary Examiner* — Boyer D Ashley
*Assistant Examiner* — Omar Flores-Sánchez
(74) *Attorney, Agent, or Firm* — Harness, Dickey & Pierce, P.L.C.

(57) ABSTRACT

A pair of saw blades includes a first blade, which is adapted to rotate in a first direction about an axis of rotation, and a second blade, which is adapted to rotate in a second direction opposite to said first direction about the same axis of rotation. Each blade has a blade body and cutting elements, which are provided along the periphery of the blade body and adapted to run close and in parallel to each other when the blades are rotating. A spacer, which extends into a space between the two blades, is attached to at least the blade body of one of the blades in order to support itself against and slide along a peripheral part of the other opposite blade.

10 Claims, 1 Drawing Sheet

PAIR OF SAW BLADES

This application is a Divisional of U.S. application Ser. No. 10/477,429 filed Apr. 19, 2004, which is a National Phase of PCT Patent Application No. PCT/SE02/00930, filed on May 16, 2002, which claims priority under 35 U.S.C. §119 to Sweden Patent Application No. 0101714-4, filed on May 16, 2001, the contents of the applications are hereby incorporated by reference in their entirety.

TECHNICAL FIELD

Example embodiments relate to a pair of saw blades comprising a first blade, which is adapted to rotate in a first direction about an axis of rotation, and a second blade, which is adapted to rotate in a second direction opposite to the first direction about the same axis of rotation, wherein each blade has a blade body and cutting elements, which are arranged along the periphery of the blade body and adapted to run close and in parallel to each other when the blades are rotating.

BACKGROUND

In order to render cooperation possible of two saw blades, it is vital that a gap exists between their blade bodies. Traditionally this gap is created by turning down the adjacent sides of the blade bodies relatively to the periphery with the cutting elements, so that a circumferential ring is left along the periphery. This ring comprises both an unturned part of the blade body as well as said cutting elements.

One drawback of the state of the related art is that one when turning down must pay attention to that the lathe tool does not contact the cutting elements, because that might damage either the lath tool or the cutting elements. Furthermore the turning can give rise to stresses in the saw blade. Another drawback with the state of the related art is that one when optionally grinding the cutting elements must avoid contact between the grinding disc and the blade body, because one otherwise risks clogging of the grinding disc by the relatively soft material of the blade body.

SUMMARY

Against that background, the object of example embodiments is to improve a pair of saw blades in such a way that the drawbacks of the state of the art are obviated.

According to example embodiments, this is achieved in a pair of saw blades in that a spacer means, which extends into a space between the two blades, is attached to at least the blade body of one of the blades in order to support itself against and slide along a peripheral part of the other opposite blade.

By attaching a spacer means on the blade body of at least one of the blades it is made possible in an easy way to provide the necessary gap without having to turn down the main blade bodies. Furthermore the spacer means leads to the whole main blade body lying on a level with regard to the face of the saw blade beneath the cutting elements, so that these can be machined without the blade body being affected thereby.

According to one embodiment of the invention the cutting elements are saw teeth made of hard metal, the spacer means preferably comprising a part of the saw teeth of said one blade, said part being prolonged in a direction towards the rotational axis of that blade.

This solution is very easy to achieve and does not require more measures than such saw teeth do require normally, i.e. soldering onto the blade body and subsequent grinding of the saw teeth.

According to another embodiment of the invention the cutting elements are diamond clad segments.

In this context segments include both segments that are distinctly separated from each other by incisions in the periphery of the blade bodies as well as segments defined by trenches in the diamond cladding itself.

According to an embodiment especially suiting the solution with the diamond clad segments but of course even suiting the solution with the saw teeth the spacer means comprises at least one strip part, which is cemented onto the blade body of said one blade symmetrically with regard to the rotational axis of that blade.

The advantage of this solution is that it is very easy to achieve and that it renders possible the use of a plurality of materials for the strip part, such as sheet metal, plastics or ceramics.

According to a further example embodiment, the spacer means comprises at least one strip part, which is cemented onto the main blade of said one blade symmetrically with regard to the rotational axis of that blade.

The advantage of this solution is that it is very easy to accomplish and that it is well suited for cost-effective mass production.

BRIEF DESCRIPTION OF THE DRAWING

Preferred embodiments of the invention will be described in the following with reference to the accompanying drawing, wherein.

DETAILED DESCRIPTION OF EXAMPLE EMBODIMENTS

Figure 1:
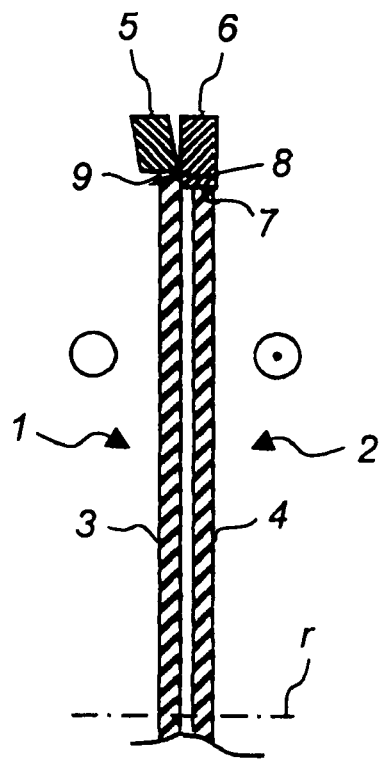
FIG. 1 is a cross-sectional view showing a part of a pair of saw blades according to a first example embodiment.

The pair of saw blades in FIG. 1 is provided for sawing wood and metal and comprises two blades 1, 2. Of these the first one is arranged to rotate about an axis of rotation r in a first direction, in this case towards the drawing surface, which is indicated by an empty ring. The other one of the two blades is arranged to rotate about the same axis of rotation in a second direction opposite to said first direction, i.e. out of the drawing surface, which is indicated by a ring with a dot in its centre.

Both saw blades 1, 2 have a blade body 3, 4, which is made of steel sheet and extends to the periphery of the blades. Along the periphery both blades have saw teeth made of hard metal, the saw teeth 6 of the second blade 2, as can be seen, having in the direction towards said axis of rotation r a prolonged part 7 compared to the saw teeth of the first blade.

Like the saw teeth 5, 6 the part 7 is ground in a suitable way, which means that said part 7 is surfaced, so that a smooth bearing surface 8 is created for the peripheral blade body portion 9 of the opposing first saw blade 1, the height of the bearing surface 8 above the blade body of the second blade 4 being chosen in such a way, that the blade bodies 3, 4 of both blades 1, 2 keep a desired distance when the bearing surface 8 abuts the blade body 3 of the first blade.

Figure 2:
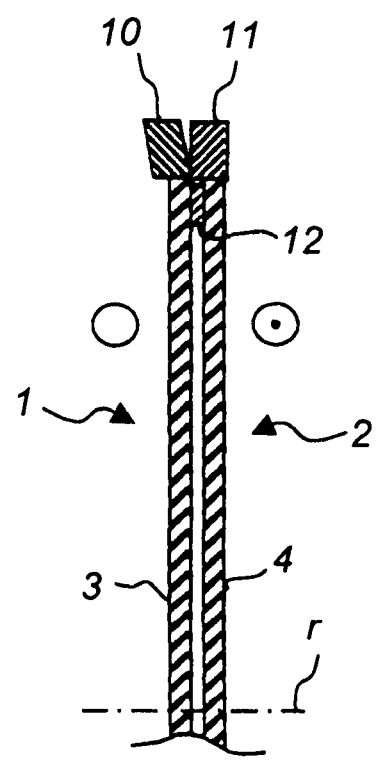
FIG. 2 is a cross-sectional view showing a part of a pair of saw blades according to a second example embodiment.

Like the embodiment in FIG. 1, the embodiment in FIG. 2 concerns a pair of saw blades 1, 2 provided for sawing wood and metal. It is shown in the same manner as the embodiment in FIG. 1 and therefore only the difference between the embodiments is raised in the following.

The difference lies in that the saw teeth 10, 11 of the two blades 1, 2 are equally long and that instead of a prolonged portion of the saw teeth of the second blade 2 separate strip pieces 12 are arranged along the periphery of the blade body 4 of this blade 2. These strip pieces 12 are suitably made of metal, such as stainless steel, but even other materials, such as plastics or ceramics, are possible.

Figure 3:
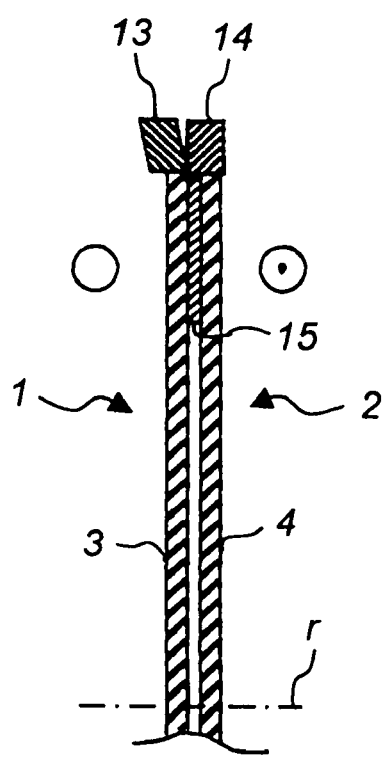
FIG. 3 is a cross-sectional view showing a part of a pair of saw blades according to a third example embodiment.

Like the embodiments in FIGS. 1 and 2 the embodiment in FIG. 3 concerns a pair of saw blades 1, 2 provided for sawing wood and metal. It is also shown in the same way as the embodiment in FIG. 1 and therefore only the difference between the two embodiments is raised in the following.

The difference lies in that the saw teeth 13, 14 of the two blades 1, 2 (as with the embodiment in FIG. 2) are equally long and that instead a prolonged portion at the saw teeth of the second blade a surface coating portion 15 is applied along the periphery of the blade body of this blade 2. The surface coating portion 15 can be a solvent based layer, a layer of a two-component material or a layer applied in a electrolytic way, such as NEDOX, which is sufficiently durable for the purpose and sufficiently hard to ensure that the blade bodies 3, 4 of the two blades 1, 2 keep the correct distance from each other.

It is obvious that example embodiments of the saw blades 1, 2 described above can be altered in different ways within the scope of the claims. Thus, it is possible to arrange the spacer means mentioned in the claims on both blades and to use blades with other cutting elements than saw teeth of hard metal.

The invention claimed is:

1. A pair of saw blades, comprising:
  a first blade, adapted to rotate in a first direction about an axis of rotation;
  a second blade, adapted to rotate in a second direction opposite to said first direction about the same axis of rotation, wherein each blade has a blade body and cutting elements, which are arranged along a periphery of the blade body and adapted to run close and in parallel to each other when the blades are rotating; and
  a spacer, extending into a space between the two blades, and attached to the blade body of one of the blades in order to support itself against and slide along a peripheral part of the other opposite blade,
  wherein the cutting elements are saw teeth made of hard metal, and
  the spacer includes a part of the saw teeth of one of the blades, the part being prolonged in a direction towards the axis of rotation of said one of the blades.

2. The pair of saw blades according to claim 1, wherein the spacer is attached to the second blade in the peripheral part of the blade body.

3. The pair of saw blades according to claim 2, wherein the spacer creates a smooth bearing surface with respect to the periphery of the blade body of the first blade.

4. The pair of saw blades according to claim 3, wherein a height of the bearing surface above the blade body of the second blade is formed such that the blade body of the first and second blades keep a desired distance when the bearing surface abuts the blade body of the first blade.

5. The pair of saw blades according to claim 1, wherein the blade body of the first and second blades are made of steel sheet.

6. A pair of saw blades, comprising:
  a first blade, adapted to rotate in a first direction about an axis of rotation;
  a second blade, adapted to rotate in a second direction opposite to said first direction about the same axis of rotation, wherein each blade includes a blade body and cutting elements, arranged along a periphery of the blade body and adapted to run proximate to each other when the blades are rotating; and
  a spacer, extending into a space between the two blades, for attaching to the blade body of one of the blades and for sliding along a peripheral part of the other blade,
  wherein the cutting elements are saw teeth made of hard metal, and
  the spacer includes a part of the saw teeth of one of the blades, the part being prolonged in a direction towards the axis of rotation of said one of the blades.

7. The pair of saw blades according to claim 6, wherein the spacer is attached to the second blade in the peripheral part of the blade body.

8. The pair of saw blades according to claim 7, wherein the spacer creates a smooth bearing surface with respect to the periphery of the blade body of the first blade.

9. The pair of saw blades according to claim 8, wherein a height of the bearing surface above the blade body of the second blade is formed such that the blade body of the first and second blades keep a desired distance when the bearing surface abuts the blade body of the first blade.

10. The pair of saw blades according to claim 6, wherein the blade body of the first and second blades are made of steel sheet.

* * * * *